United States Patent [19]
Alling et al.

[11] 3,981,060
[45] Sept. 21, 1976

[54] METHOD OF MAKING A THRUST WASHER

[75] Inventors: Richard Lassen Alling, Winchester; Richard John Woiten, Torrington, both of Conn.

[73] Assignee: The Torrington Company, Torrington, Conn.

[22] Filed: Sept. 4, 1975

[21] Appl. No.: 610,323

Related U.S. Application Data

[62] Division of Ser. No. 506,239, Sept. 16, 1974, Pat. No. 3,937,541.

[52] U.S. Cl. .............................. 29/148.4 C; 10/86 B; 113/117
[51] Int. Cl.² .................... B21D 53/12; B21K 1/05; F16C 33/64
[58] Field of Search ............... 10/73, 86 B; 85/50; 151/14 DW; 29/148.4 A, 148.4 C; 113/117; 308/212, 235

[56] References Cited
UNITED STATES PATENTS

| | | | |
|---|---|---|---|
| 2,304,155 | 12/1942 | Dyball | 10/86 B |
| 3,580,170 | 5/1971 | Furman | 308/212 |
| 3,713,713 | 1/1973 | Alling et al. | 308/235 |
| 3,918,777 | 11/1975 | Kitchin | 29/148.4 C |
| R19,116 | 3/1934 | Olson | 10/86 B |

FOREIGN PATENTS OR APPLICATIONS
395,998 7/1933 United Kingdom ............... 10/86 B

*Primary Examiner*—C.W. Lanham
*Assistant Examiner*—E. M. Combs
*Attorney, Agent, or Firm*—Frank S. Troidl

[57] ABSTRACT

The thrust race comprises circumferentially spaced tabs on the outer flange with cutouts located circumferentially adjacent each side of each tab.

The thrust race is formed from sheet metal. Annular blanks are blanked in the sheet metal, the cutouts are made on the outside perimeter of the annular blank, the tab between each pair of cutouts is formed, and the annular blank then removed from the flat sheet metal. The outer portion of the annular blank is bent to form an axially extending outer flange having a plurality of circumferentially spaced tabs extending inwardly from the flange toward the bore of the thrust washer with cutouts located circumferentially adjacent each side of each of the tabs.

2 Claims, 6 Drawing Figures

U.S. Patent  Sept. 21, 1976  3,981,060
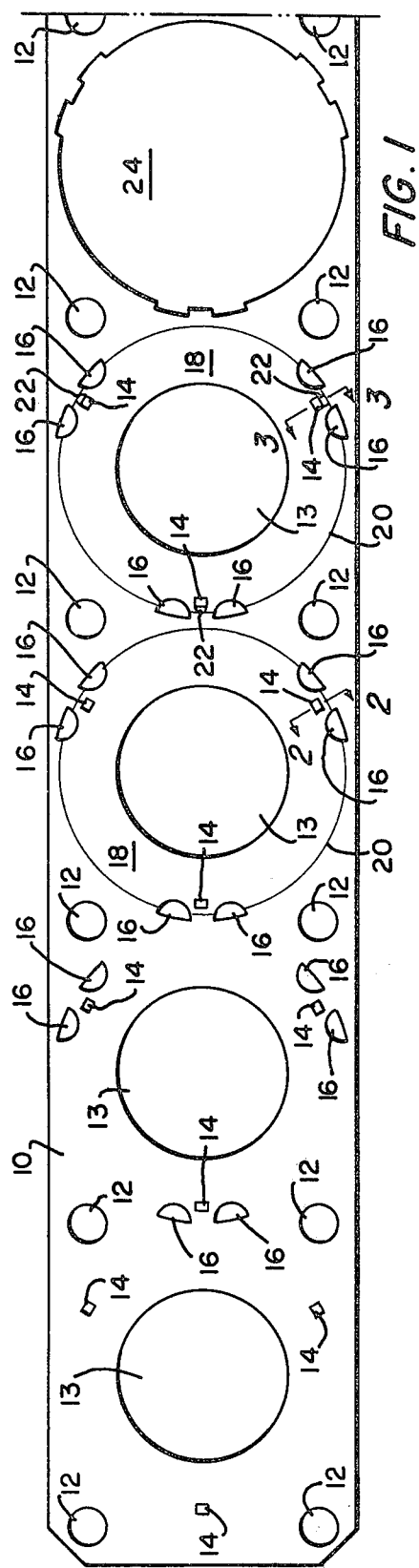
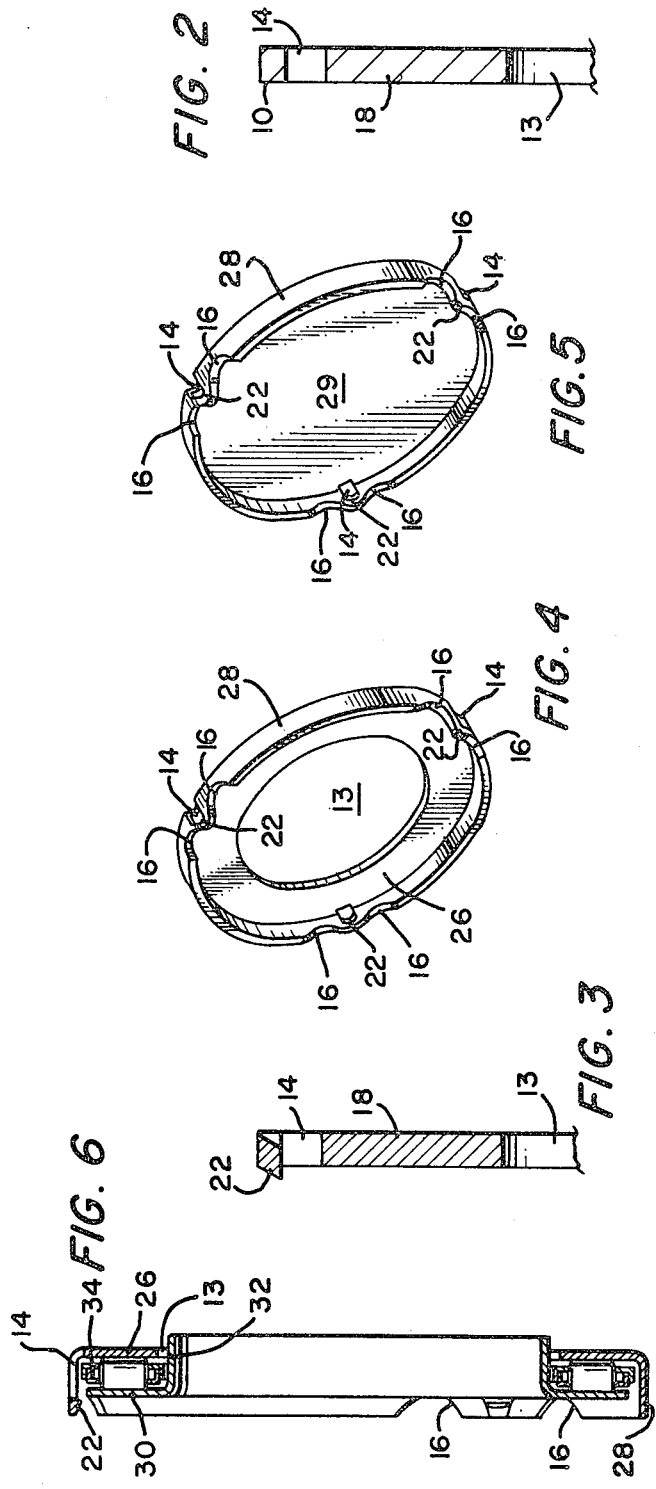

METHOD OF MAKING A THRUST WASHER

This is a division, of application Ser. No. 506,239 filed Sept. 16, 1974, now patent 3,937,541.

This invention relates to thrust bearings. More particularly, this invention is a new thrust race and new method of making a thrust race.

Briefly described, the thrust race comprises a member with a substantially circular outside periphery and a axially extending outer flange. A plurality of circumferentially spaced pairs of cutouts are provided on the flange.

Briefly described, our new method of making a thrust race comprises providing a plurality of circumferentially spaced pairs of cutouts in the sheet metal. A member having a substantially circular outside perimeter is blanked from the sheet metal. The outside perimeter has the cutouts. The outside portion of the blank is bent over to form an axially extending flange.

By making the cutouts before forming the flange, a reduction of compressive stress in the flange during the forming of the flange is obtained. Thus, buckling of the tab section is prevented. Buckling of the tab section was often a problem in making the outer flange of a thrust race, particularly a long-flanged thrust race.

The invention as well as its many advantages may be further understood by reference to the following detailed description and drawings in which:

FIG. 1 is a plan view illustrating our new method;

FIG. 2 is a view taken along lines 2—2 of FIG. 1;

FIG. 3 is a view taken along lines 3—3 of FIG. 1;

FIG. 4 is a perspective view of one preferred embodiment of our new thrust washer;

FIG. 5 is a perspective view of a second preferred embodiment of our new thrust washer; and FIG. 6 is a sectional elevational view, on an enlarged scale, showing the use of our new thrust washer as one of two washers in a bearing.

Like parts are referred to by like numbers in the various figures.

FIG. 1 illustrates a preferred embodiment of our new method. A piece of sheet metal 10 is fed into a progressive die, and all of the steps are formed in a single machine (not shown). Small circular holes 12 are provided in the flat sheet metal to receive pegs or pins (not shown) for alignment of the flat sheet in the successive machine stations. A circular hole 13 is punched into the sheet metal at a first station. Also, at this station, a plurality of circumferentially spaced apart relief holes 14 are pierced into the flat sheet metal. Relief holes 14 are radially spaced the same distance from circular hole 13.

In a next stage of the progressive die, a plurality of circumferentially spaced pairs of cutouts 16 are pierced in the sheet metal 10. The cutouts may be fully circular if desired for making the punches and dies or they may be any other desired shape. A relief hole 14 is positioned between the cutouts of each pair so that each pair of cutouts straddle a relief hole. In some thrust races there will be no relief hole 14.

In the next station annular blanks 18 having a circular outside periphery 20 are produced in the flat sheet metal 10. The blank is pressed back into the sheet 10 to be carried to the next station.

At a next station in the progressive die, the tabs 22 are formed (see FIG. 1 and FIG. 3). The tabs 22 are formed by pressing a die having protuberances of a predetermined shape against the side of the annular blank 18. The thus formed tabs 22 subsequently become the tabs on the outer flange of our new thrust washer.

At the final stage, the annular blank 18 is removed from the flat sheet metal 10 leaving the circular hole 24. The outside of the annular blank 18 is bent over to form the cylindrical axially extending flange.

Though FIG. 1 illustrates our new method of making a thrust washer, in actual practice a plurality of holes 13 will be made at one station, a plurality of blanks 18 made at the other station, etc. Also, various types of projections may be formed instead of the formed tabs 22 shown in FIG. 1. For example, so called lanced tabs or end stake projections may be used, in which cases the step of forming the relief hole 14 will be eliminated. It is not ncessary to use a progressive die in a single machine to manufacture this part. It is possible to use several individual dies in one or several machines to achieve the same results.

The new thrust race is shown in FIG. 4. It comprises an annular member 26 and an outer cylindrical flange 28 formed from the annular blank 18 of FIG. 1. The cutouts 16 on each side of each tab 22 facilitate the insertion of a cage or second thrust race under the tabs.

In the embodiment of FIG. 5, a disc 29 is provided in place of annular member 26 in FIG. 4. This embodiment can be used in cases where a shaft does not have to extend through it.

FIG. 6 is an example of a thrust bearing including our new thrust race. The thrust bearing includes a thrust race with an annular portion 30 and an inner flange 32 in addition to our new thrust race. A roller cage 34 is positioned between the two thrust races.

It is to be clearly understood that the new thrust race may be used with just a cage and roller assembly or with various other cage and roller and thrust race configurations, or with low-friction thrust bushings.

We claim:

1. A method of forming a thrust washer from sheet metal comprising: forming a plurality of circumferentially spaced pairs of cutouts in the sheet metal with the circumferential spaces separating the pairs of cutouts substantially greater than the circumferential space separating the cutouts in a pair from one another; forming a member having a substantially circular outside perimeter with the outside perimeter having the cutouts; forming a projection between the cutouts of each pair of cutouts; and bending over an outside portion adjacent said outside perimeter of the member to form an axially extending cylindrical flange which contains said projections and spaced pairs of cutouts.

2. A method in accordance with claim 1 wherein a central hole substantially hole coaxial with the cutouts is formed in the sheet metal.

* * * * *